Feb. 18, 1958     H. L. WILSON ET AL     2,824,038
TRIPLY RUBBER LAMINATE AND METHOD OF MAKING THE SAME
Filed April 29, 1952
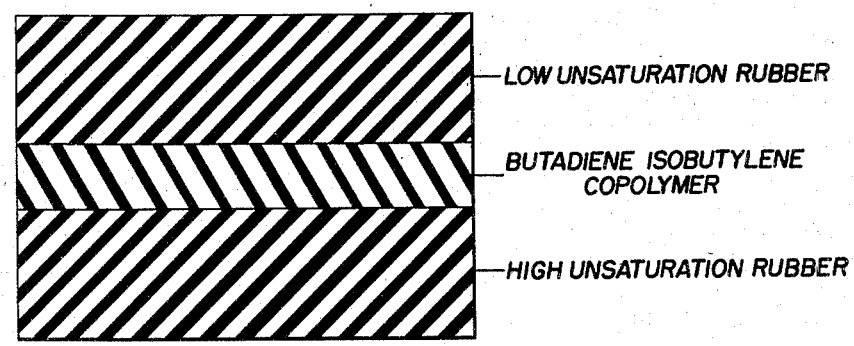
— LOW UNSATURATION RUBBER
— BUTADIENE ISOBUTYLENE COPOLYMER
— HIGH UNSATURATION RUBBER
Howard L. Wilson
Samuel B. Robison    Inventors
By *N. N. Smyers*    Attorney

United States Patent Office 2,824,038
Patented Feb. 18, 1958

2,824,038

TRIPLY RUBBER LAMINATE AND METHOD OF MAKING THE SAME

Howard L. Wilson, Raritan Township, Middlesex County, and Samuel B. Robison, Westfield, N. J., assignors to Esso Research and Engineering Company, a corporation of Delaware Application April 29, 1952, Serial No. 285,072

16 Claims. (Cl. 154—139)

This invention pertains to novel cements and preparation thereof, and to special uses of the highly unsaturated isobutylene-butadiene copolymers for bonding together dissimilar polymers and rubbery compounds.

In a variety of operations to produce plastic, rubbery, and/or elastic type structures, it is frequently desirable to make one portion of the article from one kind of plastic or rubber material, and the other portion from some other kind of plastic or rubbery substance; hence, it becomes necessary that these two different compositions should be firmly bonded to each other. It is of particularly great importance to bond together chemically dissimilar materials.

As a specific example of this type of bond between dissimilar rubbery materials, in the production of pneumatic tires containing more than one polymer type, it is necessary to form an adequate and firm bond between treads or sidewalls prepared from relatively low unsaturation isoolefin-multiolefin copolymers and the more highly unsaturated rubbery materials such as the diene-styrene copolymers, diene-nitrile copolymers, and natural rubber, and other more highly unsaturated polymers and mixtures of such rubbery materials from which the carcass is prepared.

However, natural rubber, rubber substitutes, and the various synthetic rubbery materials differ so greatly in their chemical and physical properties and in their respective reactions to compounding, filling, and vulcanizing agents and processes generally, that it is difficult to get dissimilar plastic and/or rubbery substances to adhere together in a union, joint or weld. The adhesion may be negligible or the bond formed may be too weak to be useful.

It has been customary to use interposed plies of mixtures of the respective rubber-like compounds which are to be plied or combined together, and some kinds of rubber are readily united in this way. However, mixtures of natural rubber with the isoolefin-diolefin interpolymer are of relatively low physical strength, and while such a mixed ply will serve for some purposes, the strength is undesirably low for other purposes, especially for the attaching of a low unsaturation, olefinic, synthetic polymer tread to a rubber tire carcass compounded from natural rubber or diene-styrene polymers or admixtures thereof.

The present invention uses a single cement containing isobutylene-butadiene copolymer of high unsaturation. This cement can be satisfactorily employed as a tie gum to bond together unlike rubbery, plastic, or elastic materials. The new cement or tie gum is especially useful for bonding together layers or portions of natural rubber or highly unsaturated synthetic rubbers or blends of such rubbery materials, and an isoolefin-diolefin low-temperature interpolymer.

The accompanying drawing is a cross-sectional view of an article of manufacture showing the bonding of a low unsaturation rubber lamina to a more highly unsaturated rubber lamina with the butadiene-isobutylene copolymer of the present invention.

One synthetic rubber-like substance which has found wide commercial use is the low-unsaturation interpolymer of a major proportion of an isoolefin and a minor proportion of a diolefin having 4 to 8 carbon atoms, particularly isobutylene with a diolefin such as butadiene, isoprene, the pentadienes, the methyl pentadienes, or dimethyl butadiene, the interpolymer being prepared by mixing the isoolefin and diolefin in the presence of a dissolved Friedel-Crafts catalyst at a low temperature e. g. —40 to —160° C., and polymerizing the mixture to produce polymers having Staudinger molecular weights in excess of 20,000 and molecular weights preferably ranging between 30,000 and 150,000. These may be made as described in U. S. Patent 2,356,128.

Other valuable synthetic rubber-like polymers are those of dienes such as butadiene, or butadiene with acrylonitrile or butadiene with styrene as are produced by emulsion polymerization. These polymers have Wijs iodine numbers ranging up to about 451 in contrast to the low unsaturation isoolefin-diolefin copolymer above described which normally has a Wijs iodine number within the range of 1 to about 40 or 50.

These synthetic polymers as well as natural rubber can be cured by heating with sulfur, especially in the presence of specific organic accelerators which act as vulcanization aids. However, the conditions for curing the various polymers and rubbery materials differ a great deal. In particular, the rate of cure and curing temperature of the isoolefin-diolefin interpolymer differ widely from those of natural rubber, and from the emulsion polymerizates which more closely resemble natural rubber. Accordingly, the entire processes for the cure of these polymers, and for the vulcanization of rubber are quite different, and attempts to cause bodies of the respective materials to adhere by curing them in simple contact do not give useful bonds.

Sulfur bridges are formed during vulcanization. These may occur between molecules or between points of unsaturation in the same molecule. Natural rubber, for example, is considered as 100% unsaturated while the low unsaturation isoolefin-diolefin copolymers have unsaturation of the order of 1.5%. A sulfur molecule would thus be more likely to form an intra- and/or intermolecular linkage with natural rubber than cross-link between the natural rubber and copolymer molecules to form a stable bond. Furthermore, the solubility of sulfur is of the order of three times more in natural rubber than in isoolefin-diolefin copolymers.

Bonds are produced by the present invention by the application of a single compound cement to the dissimilar polymer and rubber compounds. The polymer used in the cement is a copolymer of butadiene and isobutylene prepared from feeds of 50 to 750 parts of butadiene per 100 parts of isobutylene by Friedel-Crafts low temperature polymerization.

Although no restrictions on polymerization conditions are necessary to obtain a satisfactory cement, the copolymers prepared from feeds having 400 to 600 parts of butadiene per 100 parts of isobutylene are to be preferred. Further preference is for polymers prepared at less than 10 percent conversion based on total monomers and at diluent ratios of 4 parts of diluent per part of isobutylene or less. In general, the iodine numbers of these isobutylene-butadiene copolymers which are especially good for preparation of cements are from about 15 up to 100 (Wijs method). In any case, the unsaturation should be higher than the commercial regulation isobutylene-diolefin copolymers described in U. S. 2,356,128 which ordinarily have iodine numbers of less than 10.

For this invention, there is prepared a mixture having a ratio of butadiene to isobutylene of from 0.5 to 10 which, upon polymerization, yields a polymer having an iodine number within the range between about 15 and 150, the polymer containing from 30% up to 90% copolymerized isobutylene with from 70% to 10% copolymerized butadiene, a relatively very large proportion of butadiene thus being copolymerized into the polymer by the application to the mixture of a Friedel-Crafts catalyst in solution in a low-freezing, non-complex forming solvent; in the presence of from one volume to five volumes of diluent, or no diluent as desired.

The reaction may be conducted in a continuous reactor, or it may be conducted in a succession of separate batches, there being little choice between the two with respect to the quality of the polymer produced.

The procedure for preparing the high unsaturation polymers consists in preparing a suitable mixture of an isoolefin such as isobutylene with butadiene in the appropriate ratios in which butadiene is present in a ratio of at least 0.5 with respect to the isobutylene and up to a ratio of 10. It is desirable that relatively high purity components be used, the isobutylene desirably being at least 98% purity and the butadiene desirably at least 96% purity, preferably 98.5% purity when possible, since the reaction proceeds much more satisfactorily with chemicals of such purity. It may be noted that the presence of small amounts of saturates such as butane and propane is immaterial, but the presence of propylene, butene-1 or butene-2 is undesirable, when preparing these more highly unsaturated copolymers.

The mixture of olefins is then cooled to a relatively low temperature, preferably below 0° C., and preferably by external refrigeration such as solid carbon dioxide, or liquid ethylene (which is the preferred refrigerant), or such other refrigerants as liquid methane, especially in admixture with liquid propane or liquid ethane, or internal cooling may be used, as above or with butane, ethyl or methyl chloride, and the like. To this mixture of olefins and diluent-refrigerant, there is then added a solution of a Friedel-Crafts catalyst such as an active halide catalyst, for example, aluminum chloride, aluminum bromide, zirconium chloride, boron fluoride, titanium chloride, or uranium chloride dissolved in an inert, low-freezing solvent such as a lower hydrocarbon or an alkyl halide as ethyl or methyl chloride or carbon disulfide or other similar low-freezing, non-complex forming solvent. The catalyst solution is preferably applied to the rapidly stirred olefin-containing mixture, in finely dispersed form. The polymerization proceeds rapidly to yield a slurry or mass of the copolymer in the residual diluent-refrigerant and unreacted monomers.

The polymerization reaction is preferably continued until about 10% to 70% of the total monomer reactants present have reacted. Polymer products made in reactions in which the conversions are limited to not more than 20% are considered best. When the desired level of conversion is reached, the reaction is desirably quenched by mixing the polymerization reaction mixture with a combined oxygen-containing substance such as an alcohol, a ketone or an acid, or an alkaline agent such as caustic or carbonate solution or ammonia or other similar quenching agent. The polymer is then brought up to room temperature and in so doing, the diluent, the refrigerant, the catalyst solvent, and the unreacted olefins are volatilized and any decomposition products of the active metal halide catalyst substance are removed by washing. The polymer is then isolated and dried, and is ready for the next step of the present invention of preparing the cements. The process of making the more highly unsaturated isobutylene-butadiene copolymer having the higher iodine numbers is described and claimed along with the novel high unsaturation copolymers in S. N. 788,640, filed November 28, 1947, now Patent 2,607,764.

The new single cements are then made up by compounding the copolymer into either sulfur or non-sulfur-containing recipes using a rubber mill for the blending operations. In formulating these cements, the following recipes are typical and were tested and found to be satisfactory for bonding isoolefin-diolefin copolymers to natural rubber and to butadiene-styrene copolymers as well as to mixtures thereof. Variations in the components of the recipes are possible, and in some cases, may be desirable to achieve optimum results.

CEMENT RECIPES

|  | Cement | | |
| --- | --- | --- | --- |
|  | A | B | C |
|  | Parts by Weight | | |
| Polymer (isobutylene-butadiene copolymer) | 100 | 100 | 100 |
| Zinc Oxide | 5 | 5 | 5 |
| Carbon Black | 50 | 50 | 50 |
| Sulfur | 5 | | |
| Tetramethylthiuram disulfide | 3 | | |
| p,p'-Dibenzo quinone dioxime | | 6 | |
| p-Quinone dioxime | | | 4 |
| Red Lead Oxide | | 10 | 10 |

The compounded recipes can then be mixed with a solvent if desired which may be any solvent capable of dissolving or dispersing the rubbery copolymer but which possesses some volatility properties. The straight chain and branched chain paraffin hydrocarbons have been found to be especially useful as solvents. Or a solvent such as benzene, toluene, petroleum naphtha or suitable chlorinated hydrocarbons may be used. Hexane is a good solvent which may be employed for preparing the cements of this invention. If other materials are used in the compounding recipe, such inorganic materials as zinc oxide and carbon black may be insoluble. In any case, a solution or a dispersion may be prepared and used. A mixture containing about 6 to 15% by weight of solids can be prepared. A cement with hexane as a solvent and having about 10% solids is preferred.

The rubber and copolymer formulations used in the preparation of adhesion test specimens are shown below. The isobutylene-isoprene copolymer was prepared by the generally known methods for making such copolymers and especially by the procedures as shown in U. S. Patent 2,356,128 to Thomas and Sparks using about 3 weight percent of isoprene and 97 weight percent of isobutylene in the polymerization feed. The procedure for making the butadiene-styrene copolymer rubber (GR–S) is well known to the art.

FORMULATIONS EMPLOYED IN ADHESION TESTING

|  | Adhesion Pads, Parts by Wt. | | | |
| --- | --- | --- | --- | --- |
|  | Isobutylene-Isoprene Copolymer | Butadiene-styrene Copolymer | Natural Rubber (Smoked Sheet) | Natural Rubber Butadiene-styrene Copolymer Blend [1] |
| Polymer | 100 | 100 | 100 | 100 |
| Zinc Oxide | 5 | 5 | 5 | 5 |
| (SRF) Carbon Black | 15 | 20 | 40 | 20 |
| Stearic Acid | 0.5 | 1 | 1 | 1 |
| Furnace Black (fine particle) | 35 | 25 | | 20 |
| Sulfur | 2 | 3 | 2.8 | 3 |
| Tetramethylthiuram disulfide | 1 | | | |
| 2,2'-Benzothiazyl disulfide | | 1 | 0.7 | 1 |
| Petroleum Softener | 3 | 5 | | 3 |
| Tellurium dithiocarbamate | 1 | | | |
| Phenyl beta-naphthylamine | | 1 | | |
| Pine Tar | | | 3 | |

[1] A blend of 2 parts copolymer to 1 part natural rubber smoked sheet by weight.

The adhesion test samples were prepared by applying the same test cements to the surfaces of two calendered pads 4 x 6 x .075 inch. Following drying of the cements, two calendered surfaces were joined and the adhesion sample rolled under light pressure to facilitate the removal of air. The specimens were then backed with a light cotton duck and vulcanized with a low mold pressure. The test specimens were cured for 30 minutes at 300° F. One inch wide test strips were cut from 4 x 6 x .150 inch adhesion pads and pulled on the Scott tensile tester at 2 inches per minute jaw separation rate.

The invention will be more completely described by the following examples which are presented as representative embodiments of the invention but not with the intention of any limitation thereto.

Example I

The polymers shown in Table 1 below were prepared via Friedel-Crafts catalyzed low temperature polymerization of mixed isobutylene and butadiene coreactants in an inert media of methyl chloride. The polymerizations were conducted in a 6" diameter batch reactor using external liquid ethylene refrigeration. After hot milling the polymers to remove the last traces of monomers and water, the Mooney viscosity was determined. The physical properties of these polymers are shown in Table 2.

To promote ease of compounding and to improve the smoothness of cements, the copolymers were treated with 0.1 or 0.2% by weight of a solution of 36.5% xylyl mercaptan in an inert hydrocarbon media. This peptizing agent was milled into the copolymer on a cool mill and the copolymers were then treated for 10 minutes on a 300° F. mill.

TABLE 1.—COMPARISON OF POLYMERS PREPARED WITH DIFFERENT MONOMER RATIOS

| Polymer Number | Feed | | | | Catalyst | | Percent Conv. based on total reactants |
|---|---|---|---|---|---|---|---|
| | Methyl Chloride diluent | Isobutylene | Butadiene (A) | Designation, pts. by wt. of diolefin/100 pts. by wt. of isobutylene | Conc., g. AlCl$_3$/100 cc. MeCl | Eff., g. ploymer/ g. catalyst | |
| 1 | 2,400 | 800 | 400 | A-50 | 0.46 | 910 | 45.5 |
| 2 | 1,800 | 800 | 800 | A-100 | 0.46 | 240 | 44.2 |
| 3 | 1,050 | 700 | 1,400 | A-200 | 0.25 | 106 | 12.1 |
| 4 | 1,000 | 500 | 1,000 | A-200 | 0.26 | 89 | 5.8 |
| 5 | 1,000 | 500 | 2,000 | A-400 | 0.49 | 60 | 17.2 |
| 6 | 1,800 | 450 | 1,800 | A-400 | 0.58 | 76 | 14.9 |
| 7 | 1,500 | 350 | 1,750 | A-500 | 0.58 | 63 | 9.5 |
| 8 | 250 | 500 | 3,000 | A-600 | 0.49 | 60 | 17.2 |
| 9 | 1,500 | 350 | 2,100 | A-600 | 0.58 | 51 | 9.3 |
| 10 | 1,500 | 350 | 2,100 | A-600 | 0.58 | 35 | 4.9 |
| 11 | 200 | 400 | 3,000 | A-750 | 0.25 | 132 | 18.8 |
| 12 | 1,500 | 300 | 2,250 | A-750 | 0.58 | 52 | 9.6 |

TABLE 2

| Polymer Number | Mooney Viscosity, 1½'-8' | Percent Gel | I$_2$ No. (drastic I$_2$-Hg acetate method) | I$_2$ No. (Wijs Method) |
|---|---|---|---|---|
| 1 | 59-54 | 0 | 17.4 | 22.4 |
| 2 | 97-98 | 16.3 | 38.5 | 49.6 |
| 3 | 88-86 | 39.7 | 52.8 | 68.0 |
| 4 | | | 37.6 | 48.5 |
| 5 | 69-60 | 86.9 | 34.2 | 44.1 |
| 6 | 90-80 | 85.6 | 38.2 | 49.2 |
| 7 | 91-80 | 85.0 | 44.0 | 56.7 |
| 8 | 69-60 | 90.2 | 43.9 | 56.6 |
| 9 | 98-83 | 86.5 | | |
| 10 | 92-81 | 76.9 | 60.6 | 78.1 |
| 11 | 75-66 | 92.0 | 45.0 | 58.0 |
| 12 | 100-87 | 78.3 | 68.6 | 88.4 |

Example II

The copolymers, treated or untreated, were then compounded on a laboratory mill with recipes A, B and C as shown above. These compounds were then placed in cans and sufficient hexane added to make a dispersion of about 10% solids. The mixture of hexane and polymer was shaken until a smooth cement was formed. Pads of low unsaturation isobutylenediolefin compound, GR-S compound and natural rubber compound were prepared from the recipes shown above.

After cementing the respective green pads together with the respective cement, the bonded pads were cured for 30 minutes at 300° F. The adhesion tests conducted on these plied pads gave the results shown in Table 3.

TABLE 3.—ADHESION OF ISOBUTYLENE-DIOLEFIN COPOLYMER TO GR-S AND NATURAL RUBBER WITH EXPERIMENTAL CEMENTS

| Polymer Number | Polymer Designation | Pounds per Linear Inch [1] | | | |
|---|---|---|---|---|---|
| | | Adhesion of GR-S to GR-I | | Adhesion of GR-I to Natural Rubber | |
| | | Recipe A | Recipe C | Recipe A | Recipe C |
| 1 | A-50 | 5 | 11 | 5 | |
| 2 | A-100 | 7 | 11 | 11 | |
| 3 | A-200 | 7 | 15 | 9 | |
| 5 | A-400 | 9 | 19 | 11 | |
| 6 | A-400 | 19 | 24 | 15 | 7 |
| 7 | A-500 | 16 | 21 | 13 | 29 |
| 8 | A-600 | 7 | 13 | 8 | |
| 9 | A-600 | 10 | 19 | 11 | 40 |
| 10 | A-600 | 13 | 25 | 11 | 8 |
| 11 | A-750 | 7 | 14 | 8 | |
| 12 | A-750 | 9 | 14 | 9 | 9 |

[1] Pulled on a Scott tensile tester at 2.0 inches per minute jaw separation.

The data in Table 3 above indicate that the A-50 to A-750 polymers give cements which form good bonds between the low unsaturation copolymer and GR-S or natural rubber. The cements obtained from A-400 to A-600 polymers are particularly good.

Example III

A series of polymers of A-500 (500 parts butadiene to 100 parts of isobutylene in the feed) were prepared at different conversion levels to determine if this condition of polymerization affected the adhesion. Polymer preparations are listed in Table 4. The physical properties of the resulting polymers are tabulated in Table 5.

TABLE 4.—COMPARISON OF POLYMERS PREPARED AT DIFFERENT CONVERSIONS

| Polymer Number | Feed | | | | Catalyst | | Percent Conv. based on total reactants |
|---|---|---|---|---|---|---|---|
| | Methyl Chloride diluent | Isobutylene | Butadiene (A) | Designation, parts by wt. of diolefin/100 pts. by wt. of isobutylene | Conc., g. AlCl$_3$/100 cc. MeCl | Eff., g. polymer/g. catalyst | |
| 13 | 700 | 350 | 1,750 | A-500 | 0.26 | 30 | 5.8 |
| 14 | 450 | 450 | 2,250 | A-500 | 0.25 | 45 | 7.7 |
| 15 | 800 | 400 | 2,000 | A-500 | 0.47 | 51 | 9.4 |
| 16 | 800 | 400 | 2,000 | A-500 | 0.58 | 101 | 19.7 |
| 17 | 800 | 400 | 2,000 | A-500 | 0.47 | 171 | 35.9 |

TABLE 5

| Polymer Number | Mooney Viscosity, 1½'-8' | Percent Gel | I$_2$ No. (drastic I$_2$-Hg acetate method) | I$_2$ No. (Wijs method) |
|---|---|---|---|---|
| 13 | 91-80 | 85.0 | 44.0 | 56.7 |
| 14 | 75-69 | 76.6 | 66.8 | 86.1 |
| 15 | 91-76 | 89.6 | 36.2 | 46.7 |
| 16 | 90-80 | 91.8 | 37.6 | 48.5 |
| 17 | 75-68 | 98.7 | 24.2 | 31.2 |

*Example IV*

The adhesions of these polymers as cements are shown in Table 6. In general, the adhesions were good for all polymers with a tendency for greater adhesions of isobutylene-diolefin copolymers to GR-S when the conversion was less than 10% of the charged monomers.

The manipulation of these polymers for testing was the same as that used in Examples I and II.

TABLE 6.—ADHESION OF ISOBUTYLENE-DIOLEFIN COPOLYMER TO GR-S AND NATURAL RUBBER WITH A-500 CEMENTS

| Polymer Number | Polymer Designation | Pounds per Linear Inch [1] | | | |
|---|---|---|---|---|---|
| | | Adhesion of GR-S to GR-I | | Adhesion of GR-I to Natural Rubber | |
| | | Recipe A | Recipe C | Recipe A | Recipe C |
| 13 | A-500 | 17 | 30 | 14 | 12 |
| 14 | A-500 | 16 | 26 | 12 | |
| 15 | A-500 | 14 | 26 | 14 | 8 |
| 16 | A-500 | 5 | 14 | 12 | 18 |
| 17 | A-500 | 12 | 14 | 14 | 12 |

[1] Pulled on a Scott tensile tester at 2.0 inches per minute jaw separation.

*Example V*

In this example for preparation of the cement polymers, the ratio of methyl chloride to isobutylene was varied while the butadiene to isobutylene ratio was kept constant. Polymer preparations are listed in Table 7. Physical properties of the polymers are shown in Table 8.

TABLE 8

| Polymer Number | Mooney Viscosity 1½'-8' | Percent Gel | I$_2$ No. (drastic I$_2$-Hg acetate method) | I$_2$ No. (Wijs Method) |
|---|---|---|---|---|
| 14 | 75-69 | 76.6 | 66.8 | 86.1 |
| 15 | 91-76 | 89.6 | 36.2 | 46.7 |
| 7 | 91-80 | 85.0 | 44.0 | 56.7 |
| 18 | 84-72 | 84.8 | 42.6 | 55.0 |

*Example VI*

Adhesion data on cements prepared from the polymers of Example V in which the diluent ratio was varied are tabulated in Table 9. In each case, as the diluent ratio increased, the adhesion had a tendency to become somewhat lower, particularly in recipe C for GR-I to GR-S. The bonding to natural rubber was relatively less affected by the conditions of polymerization.

TABLE 9.—ADHESION OF ISOBUTYLENE-DIOLEFIN COPOLYMER TO GR-S AND NATURAL RUBBER WITH A-500 CEMENTS

| Polymer Number | Polymer Designation | Pounds per Linear Inch [1] | | | |
|---|---|---|---|---|---|
| | | Adhesion of GR-S to GR-I | | Adhesion of GR-I to Natural Rubber | |
| | | Recipe A | Recipe C | Recipe A | Recipe C |
| 14 | A-500 | 16 | 26 | 12 | |
| 15 | A-500 | 14 | 26 | 14 | 8 |
| 7 | A-500 | 16 | 21 | 13 | 29 |
| 18 | A-500 | 13 | 19 | 12 | 8 |

[1] Pulled on a Scott tensile tester at 2.0 inches per minute jaw separation.

The above examples indicate that a wide variety of butadiene-isobutylene copolymers can be produced under different conditions that can be compounded and made into excellent cements. However, the scope of this invention is not limited to a narrow range of these copolymers shown above. Optimum adhesions are obtained with A-400 to A-600 polymers produced at less than 10%

TABLE 7.—COMPARISON OF POLYMERS PREPARED AT DIFFERENT DILUENT RATIOS

| Polymer Number | Feed—cc. | | | | Diluent Ratio MeCl/Isobutylene | Catalyst | | Percent Conv. based on total reactants |
|---|---|---|---|---|---|---|---|---|
| | Methyl Chloride diluent | Isobutylene | Butadiene (A) | Designation Polymer | | Conc., g. AlCl$_3$/100 cc. MeCl | Eff., g. polymer/g. catalyst | |
| 14 | 450 | 450 | 2,250 | A-500 | 1:1 | 0.25 | 45 | 7.7 |
| 15 | 800 | 400 | 2,000 | A-500 | 2:1 | 0.47 | 51 | 9.4 |
| 7 | 1,500 | 350 | 1,750 | A-500 | 4.3:1 | 0.58 | 63 | 9.5 |
| 18 | 2,400 | 350 | 1,750 | A-500 | 6.85:1 | 0.58 | 76 | 13.6 | conversion (based on total monomers) and at diluent ratios of less than 4.3:1 based on isobutylene.

Example VII

The scope of this invention is not limited in any way to the compounding ingredients employed. The curatives, fillers including resins, and solvents employed can be exactly tailored to suit the details of the problem, e. g., hardness of compounds being cemented, drying time desired, and vulcanizing time and temperature employed. The adhesion obtained in four different recipes for Polymer No. 16 is shown in Table 10 below to indicate that the fillers and resins may be changed.

TABLE 10

| Ingredients | Recipe A | | | |
|---|---|---|---|---|
| | #1 | #2 | #3 | #4 |
| | Parts by Weight | | | |
| Polymer No. 16 | 100 | 100 | 100 | 100 |
| Zinc Oxide | 5 | 5 | 5 | 5 |
| S. R. F. Carbon Black | 50 | | | 50 |
| M. P. C. Carbon Black | | 50 | | |
| Calcium Carbonate | | | 50 | |
| Stabilizer Ester Gum | | | | 20 |
| Sulfur | 5 | 5 | 5 | 5 |
| Tuads (tetramethylthiuram disulfide) | 3 | 3 | 3 | 3 |
| Adhesion, lbs. per linear in | 12 | 11 | 18 | 8 |

The above adhesion tests were carried out by using the cement as 10% solids in Hexane to bond pads of GR-S to GR-I pads. The bonded pads were vulcanized at 30' at 300° F. and test for 2 inch per minute separation rate.

Example VIII

The invention cements prepared from the butadiene-isobutylene copolymers are not limited to GR-S or natural rubber alone but can be successfully employed to bond low unsaturation GR-I to mixtures of the two more highly unsaturated polymers. Their effectiveness in bonding raw GR-I to previously cured GR-S, natural rubber or blends thereof is extremely good. Examples of Table 11 indicate these general applications.

TABLE 11

| Polymer Number | Polymer Designation | Adhesion of GR-I to— | | | | | |
|---|---|---|---|---|---|---|---|
| | | Raw (GR-S, Natural Rubber Blend)[1] | | Cured [2] Blend [1] | | Cured [2] GR-S | |
| | | Recipe | Adhesion | Recipe | Adhesion | Recipe | Adhesion |
| 6 | A-400 | C | 23 | C | 12 | A | 13 |
| 15 | A-500 | C | 20 | | | | |
| 14 | A-500 | | | | | C | 13 |
| 9 | A-600 | C | 20 | C | 14 | A | 30 |
| 12 | A-750 | C | 20 | | | C | 11 |

[1] Blend compound prepared of ⅓ smoked sheet and ⅔ GR-S by weight.
[2] GR-S and GR-S blend adhesion pads cured 20 minutes at 300° F. prior to testing cement. Surface smoothness of the cured pad was removed prior to application of the cement.

These tests show the practical application of the invention cements for bonding isobutylene-isoprene copolymer (GR-I) tread stocks in "recapping" old tires which are generally made from GR-S or GR-S natural rubber blends part or all of which may have been previously subjected to curing.

Example IX

The use of the novel tie ply cement of this invention makes possible the construction of a pneumatic tire by bonding together rubbery materials of high and low levels of chemical unsaturation. The tire carcass may be prepared in conventional manner by impregnating and/or calendering natural or synthetic fibers, or even metal wire, with high unsaturation rubbers containing normal constituents such as sulfur, vulcanizing accelerators, fillers, reclaimed rubber, softeners, etc. To this carcass or cushion is applied a tie gum or cement prepared from the isobutylene-butadiene cements as described in the above examples.

The tread and sidewall can be prepared for tire building by extrusion or calendering operations according to techniques well known in the art from a low unsaturation rubber prepared predominantly from isobutylene and a conjugated diolefin such as isoprene or butadiene, also containing normal constituents, curvatives, softener, filler, etc. The surface of the isobutylene-diolefin copolymer which contacts the cushion or tire casing prepared using high diolefin rubber may be coated with the copolymer cement prior to assembly. The tires may then be vulcanized in customary manner.

Example X

Alternatively the invention may be utilized for the application to various structures having jackets made up of the low unsaturation isobutylene-diolefin copolymer material which is highly resistant to oxidation by ozone, air or other reactants and highly resistant to sunlight, ultraviolet light and heat, as well as highly resistant to flexure, abrasion, and other mechanically destructive influences. Articles in which this type of structure is particularly advantageous are pneumatic tires as above described; cables in which an insulation of natural rubber, either new or reclaimed, is protected by a jacket of the copolymer held in place by an intervening layer of the tripolymer tie gum; belts either for the transmission of power or conveyor belts, in which a fabric carcass impregnated with rubber is protected by a jacket of polymer in which instance the combination is particularly advantageous because of the high strength and high abrasion resistance of the copolymer ply.

What is claimed is:

1. An article of manufacture comprising a body of a low temperature interpolymer of a major amount of isobutylene with a minor proportion of a conjugated diolefin, the interpolymer being characterized by a low unsaturation within the range of a Wijs iodine number between 0.5 and 10, a molecular weight above 20,000 and reactivity with a curing agent to yield an elastic product; a second body of a rubbery material, characterized by a high unsaturation within the range of a Wijs iodine number between that of GR-S synthetic rubber and 451, and reactivity with a curing agent; and a third, interposed body comprising a copolymer of interpolymerized isobutylene and butadiene, said copolymer prepared from an olefinic feed mixture having 50 to 750 parts of butadiene per 100 parts of isobutylene.

2. An article of manufacture according to claim 1 in which the second body is a diene-styrene interpolymer.

3. An article of manufacture according to claim 1 in which the second body is natural rubber.

4. An article of manufacture according to claim 1 in which the second body is a blend of a diene-styrene interpolymer and natural rubber.

5. An article of manufacture according to claim 1 in which the interposed, third body comprises a copolymer of interpolymerized isobutylene and butadiene, said copolymer prepared by the polymerization of an olefinic feed mixture having 400 to 600 parts of butadiene per 100 parts of isobutylene, and not more than about 4 parts of diluent per part of isobutylene to a conversion not greater than 10%.

6. An article of manufacture comprising a triply laminated structure, one of said laminae comprising a cured, synthetic, solid interpolymer of a major proportion of isobutylene and a minor proportion of a conjugated diolefin, the interpolymer being characterized by an unsaturation below a Wijs iodine number of 10, a molecular weight above 20,000 and reactivity with a curing agent to yield an elastic product; a second lamina of a cured rubbery material, characterized by a high unsaturation within the range of a Wijs iodine number between that of GR-S synthetic rubber and 451, and reactivity with a curing agent; and a third, interposed, lamina of a cured copolymer of interpolymerized isobutylene and butadiene, said copolymer prepared by the polymerization of an olefinic feed mixture having 50 to 750 parts of butadiene per 100 parts of isobutylene.

7. An article of manufacture according to that described in claim 6 in which the third, interposed lamina comprises a cured copolymer of interpolymerized isobutylene and butadiene, said copolymer prepared by the polymerization of an olefinic feed mixture having 400 to 600 parts of butadiene per 100 parts of isobutylene, and not more than about 4 parts of diluent per part of isobutylene to a conversion not greater than 10%.

8. The method of uniting a solid isoolefin-diolefin interpolymer material, prepared by reacting together a major proportion of isobutylene and a minor proportion of a conjugated diolefin having from 4 to 8 carbon atoms, in the presence of a dissolved Friedel-Crafts catalyst, at a temperature between —40° C. and —160° C., said interpolymer having a Wijs iodine number below 10, and a molecular weight greater than 20,000, to a high unsaturation, rubbery material having a Wijs iodine number between that of GR-S synthetic rubber and 451, which comprises interposing between the said two materials a layer comprising a copolymer of isobutylene and butadiene, said copolymer prepared from an olefinic feed mixture having 50 to 750 parts of butadiene per 100 parts of isobutylene.

9. The method according to claim 8 in which the high unsaturation rubbery material is a diene-styrene interpolymer.

10. The method according to claim 8 in which the high unsaturation rubbery material is natural rubber.

11. The method according to claim 8 in which the high unsaturation rubbery material is a blend of a diene-styrene interpolymer and natural rubber.

12. A method according to claim 8 in which the interposed, third body comprises a copolymer of interpolymerized isobutylene and butadiene, said copolymer prepared by the polymerization of olefinic feed mixture having 400 to 600 parts of butadiene per 100 parts of isobutylene, and not more than about 4 parts of diluent per part of isobutylene to a conversion not greater than 10%.

13. An article of manufacture comprising a triply laminated structure, one of said laminae comprising a cured GR-I synthetic rubber interpolymer prepared from a polymerization feed composed of about 97% of isobutylene and about 3% of isoprene, said interpolymer being characterized by a low unsaturation in the range of a Wijs iodine number about 1 to 10, and a Staudinger molecular weight of at least 30,000; a second lamina of a cured high unsaturation rubbery material selected from the group consisting of natural rubber and GR-S synthetic rubber; and a third interposed lamina of a cured copolymer of interpolymerized isobutylene and butadiene, said copolymer prepared by polymerization of a feed mixture having 100 to 750 parts of butadiene per 100 parts of isobutylene, and said copolymer having an 8 minute Mooney of about 60 to 98 and about 16 to 87% gel, and said triply article being bonded together with an adhesion of at least 7 lbs. per linear inch when the intermediate bonding lamina is cured with a sulfur curing agent, and an adhesion of at least 14 lbs. per linear inch when said bonding lamina is cured with a quinone dioxime curing agent.

14. Article according to claim 13 in which th GR-I lamina is bonded to a GR-S lamina, and the intermediate bonding lamina comprises an isobutylene-butadiene interpolymer prepared by polymerization of olefinic feed mixture having about 400–600 parts of butadiene per 100 parts of isobutylene, said copolymer having an 8 minute Mooney of about 60 to 83 and a gel of about 77 to 87%, and said copolymer having been cured with a quinone dioxime curing agent, said triply showing an adhesion of at least 19 lbs. per linear inch.

15. The method of making a triply laminated article composed of one lamina of GR-I synthetic rubber having a Wijs iodine number of about 1 to 10 bonded to a lamina of GR-S synthetic rubber by an intermediate bonding lamina, which comprises preparing an adhesive interpolymer cement consisting of interpolymerized isobutylene and butadiene, prepared from an olefinic feed mixture having 50 to 750 parts of butadiene per 100 parts of isobutylene, dispersed in a concentration of about 6 to 15% by weight of solids in a volatile, aliphatic, paraffinic solvent, adding a curing amount of curing agents to said cement, applying said cement to one side of said GR-I lamina and to one side of said GR-S lamina, drying said cement-coated surfaces, then joining them under pressure and subjecting said laminated article to heat to cure said bonding lamina of interpolymer.

16. Method according to claim 15 in which the cement used comprises an interpolymer prepared by polymerization of an olefinic feed mixture having from 400 to 600 parts by weight of butadiene per 100 parts of isobutylene, said interpolymer having an 8 minute Mooney of about 60 to 83 and a gel of about 77 to 87%, said cement also containing about 50 parts of carbon black, about 4 parts of para-quinone dioxime and about 10 parts of red lead oxide per 100 parts by weight of said interpolymer, and said cement also containing hexane in sufficient amount to make a dispersion of about 10% solids, whereby said cured triply laminated article shows adhesion of at least 10 lbs. per linear inch.

References Cited in the file of this patent

UNITED STATES PATENTS

| | | |
|---|---|---|
| 2,399,558 | McArdle et al. | Apr. 30, 1946 |
| 2,405,943 | Doering et al. | Aug. 20, 1946 |
| 2,583,387 | Morrissey et al. | Jan. 22, 1952 |

FOREIGN PATENTS

| | | |
|---|---|---|
| 112,875 | Australia | Apr. 24, 1941 |